Dec. 14, 1937.   F. G. HODSDON   2,102,267
PRESSURE RELEASER MILKING SYSTEM
Filed March 24, 1937   3 Sheets-Sheet 2
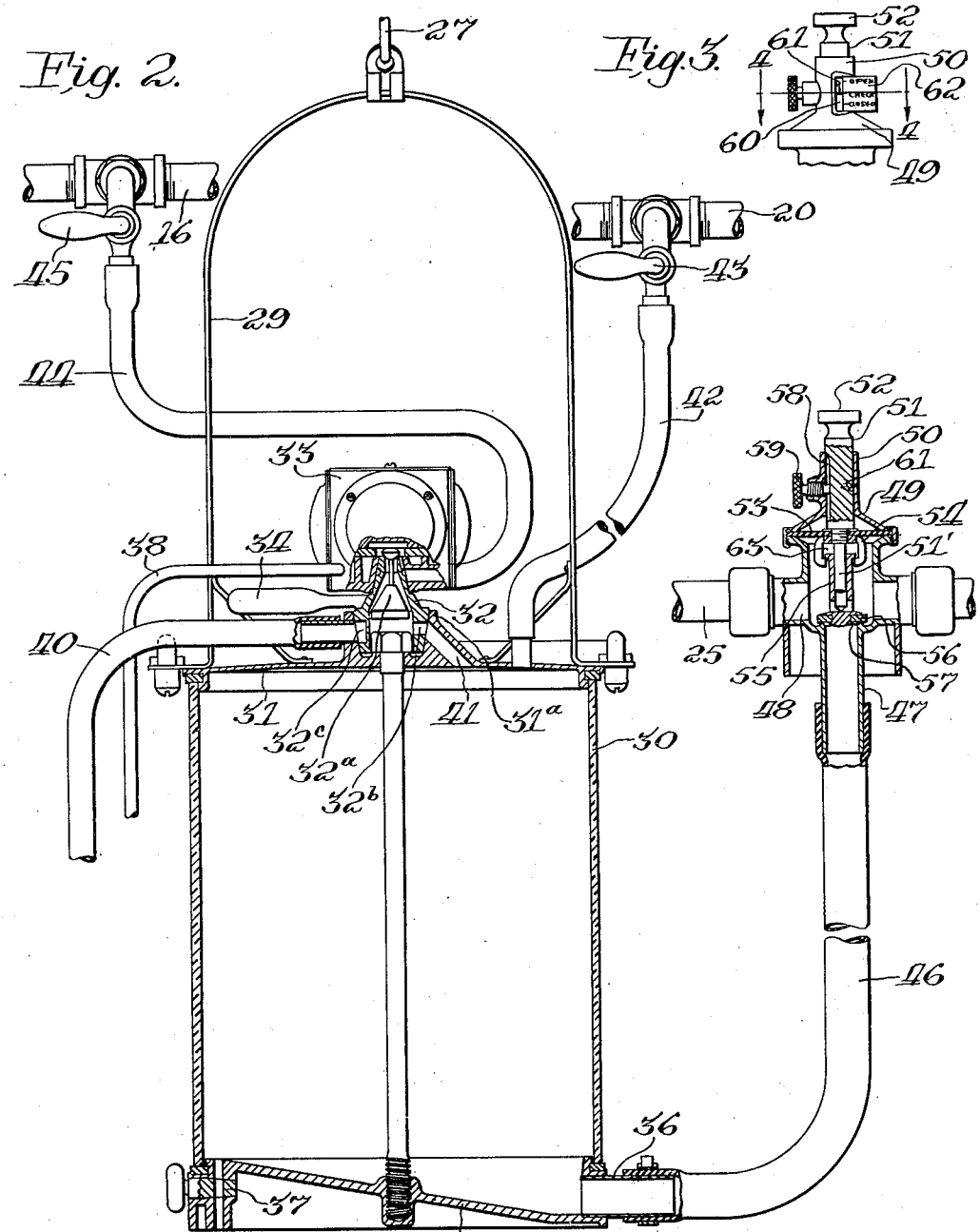
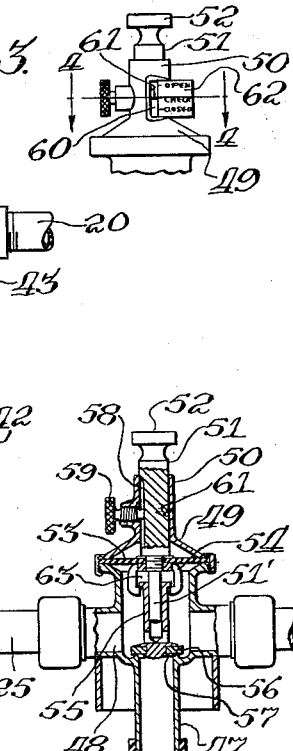
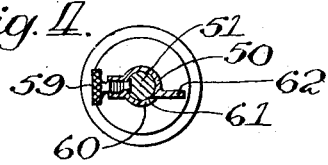
Inventor
Floyd G. Hodsdon Dec. 14, 1937.　　　F. G. HODSDON　　　2,102,267
PRESSURE RELEASER MILKING SYSTEM
Filed March 24, 1937　　　3 Sheets-Sheet 3

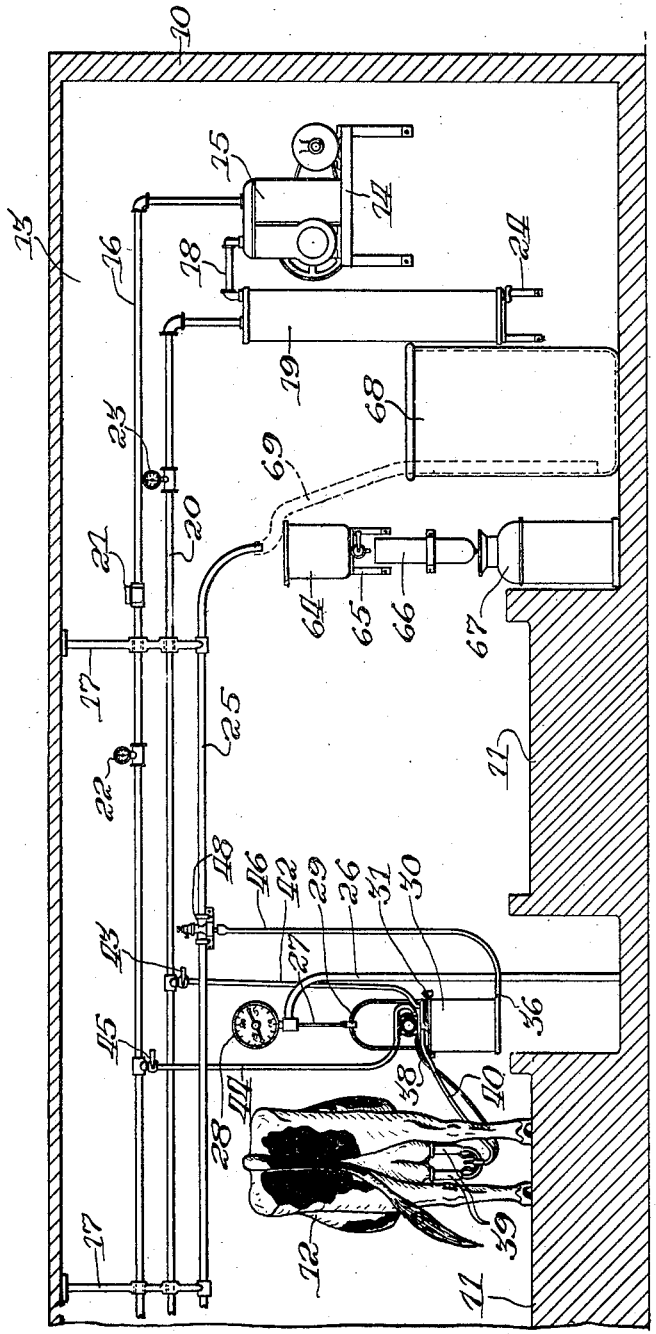

Inventor
Floyd G. Hodsdon

Patented Dec. 14, 1937

2,102,267

UNITED STATES PATENT OFFICE 2,102,267

PRESSURE RELEASER MILKING SYSTEM

Floyd G. Hodsdon, Milwaukee, Wis., assignor to International Harvester Company, a corporation of New Jersey Application March 24, 1937, Serial No. 132,676

8 Claims. (Cl. 31—58)

The invention relates to a releaser milker system.

In modern dairy barns in which cows are mechanically milked, it is desirable to run the milk into a final bulk receiver from the milker pail associated with the milking machine. In such systems, the milk is conveyed from a cow to a receiver pail suspended from a weighing device, so that the milk from the cow may be weighed and samples may be conveniently taken therefrom for test purposes. Thereafter, it is desirable, by means of a sanitary milk pipe line to discharge the milk from the receiver pail into a final bulk receiver. The entire arrangement is such as to make for the most sanitary handling of the milk, every precaution being taken against the possibility of the milk becoming contaminated in the barn.

The present system may be installed in a barn with a suspended milk receiver pail adjacent a cow stall, so that the milk taken from the cow is delivered by the milking machine directly into the milk pail. After the milk has been weighed and a sample has been taken therefrom for test purposes, the milk may be run out of the pail by compressed air pressure through a sanitary milk pipe-line into a final bulk receiver.

The main object of the invention is to provide an improved milker releaser system.

Another important object is to provide such a milking machine system in which compressed air is utilized for positively and definitely discharging the milk from the milk receiver pail and through the milk pipe-line into a final bulk receiver.

Another object is to provide in a milk discharge line an improved valve structure.

Other important objects will become apparent to those skilled in this art as the disclosure is more fully made.

These desirable objects are attained in one practicable form by the structure herein illustrated and described, which embodies in a dairy barn a source of compressed air including an air pipe-line and valves whereby the attendant may, at the desired time, force the compressed air into the milk receiver pail associated with the milking machine to forcibly eject the milk from the pail through a milk discharge pipe-line into a final bulk receiver.

In the drawings illustrating the invention,—

Figure 1 is a general view through the system, showing the relative location of parts in the organization;

Figure 2 is an enlarged detail view of the milk receiver pail construction and the valve in the pipe-line, through which the milk is forced from the pail to a final bulk receiver;

Figure 3 is a detail view of the valve stem of the automatic valve shown in Figure 2;

Figure 4 is a detail cross-sectional view through the valve structure of Figure 3, taken along the line 4—4 and looking in the direction of the arrows;

Figure 5:
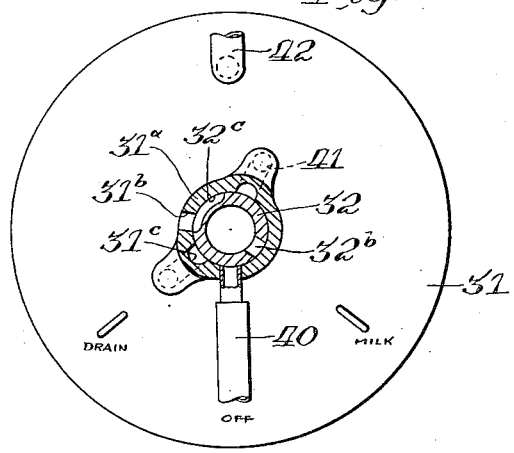
Figure 5 is a plan view of the milk pail, showing a control valve thereon in horizontal section and in the position assumed by the parts when the pail is to be drained.

Looking to Figure 1, it will be seen that the system shown embodies a dairy barn 10 having a floor formed with cow stalls 11, in which the cows stand while being milked. A cow is shown at 12 in rear elevation standing in the stall 11. The barn has a rear wall 13 which carries a shelf 14 for mounting a combination air and vacuum pump 15, which, through a pipe-line 16 hung from brackets 17, supplies vacuum to be used in the milking machine unit. The pump 15 also supplies a source of compressed air through a pipe 18, which leads the air into an air conditioning unit 19 before it is delivered into a pipe-line 20, also carried by the brackets 17 from the ceiling of the barn. The vacuum pipe-line 16 includes a vacuum regulating device 21 and a vacuum indicating gauge 22, while the air line 20 includes an air pressure indicating device 23. An air pressure safety device, not shown, may also be located in the line 20. The air conditioning tank 19 may be carried from a bracket 24 also fastened to the wall 13. The brackets 17 also carry an overhead sanitary milk discharge pipe-line 25.

Adjacent one of the stalls 11, the floor of the barn carries an upright support 26, from which is suspended a hanger 27 carried by a weighing scale 28. Said hanger 27 carries the bail 29 supporting a milk receiver pail 30, which, as shown in Figure 2, is preferably made of glass, so that the milk therein may be viewed.

Looking at Figure 2, it will be seen that this pail 30 includes a cover 31 formed in its center with a socket 31ª to carry a tapered valve plug 32 associated with a pulsator 33 mounted on said valve plug, said valve plug being turnable by means of a handle 34. The pail 30 has a bottom 35 sloping toward a milk outlet 36 at the bottom of the pail 30. Further, the bottom includes a valve plug 37 to make it possible to take samples of milk out of the pail for test purposes. Leading from the pulsator 33, which may be of any standard construction, is a pulsation air hose 38 leading to a set of teat cups 39 shown in position on the cow 12, while a vacuum supplying hose 40 leads through the valve plug 32 and a passage 41 in the cover 31, to supply vacuum from the pail 30 to the teat cups 39 when the milking machine is drawing milk from the cow through the hose 40.

Air under pressure is supplied from the pipeline 20 through hose 42 to the pail, said airline being controlled by a hand valve 43. The vacuum is supplied to the pail 30 and pulsator through a hose 44 from the vacuum pipe-line 16, the same being controlled by a hand valve 45. Associated with the bottom nipple 36 in the pail 30 is a milk discharge hose 46, which is connected to a nipple 47 for a valve housing 48 associated with the milk pipe-line 25.

This valve housing 48 communicates on opposite sides with the pipe-line 25 and carries a cover 49 having a neck 50, in which is disposed for up and down movement a stem 51 having a finger hold piece 52 at its upper end exposed above the neck 50. The lower end of this stem 51 is connected to a flexible diaphragm 53 clamped in place, as shown by the cover 49, to the housing 48, said diaphragm being carried by the stem 51, which, below the diaphragm, includes a bail-shaped piece 54 adapted to engage the top flange of a cylindrical stem 55 including at its lower end a valve 56 seated on a valve-seat 57 formed at the upper end of the nipple 47.

The stem 51 is formed with a vertical groove 58 into which fits the end of a set screw 59. A side of the neck 50, as at 60, is open to expose the stem 51 through the neck 50, said stem 51 being formed with a telltale groove 61 associated with an exterior plate extension or wing 62 carried on the neck 50, which has three vertically spaced telltale lines thereon, as shown in Figure 3, adjacent which lines respectively are imprinted the words "open", "check", and "closed." When the set-screw 59 is loosened, the operator may grasp the extension 52 to raise or lower the stem 51 to move the visible telltale groove or notch 61 thereon in relation to the three indicated positions. When the stem is lowered, so that the groove 61 registers with the telltale line indicating "closed" position, then the valve member 55, which is guided on a reduced lower extension 51' of the stem 51, jams the valve portion 56 thereof tightly against the seat 57 and locks said valve on said seat. In an intermediate or "check" position, the valve 56 is free to float up and down within limits prescribed by the lower portion of the hook on the bail member 54 and the top of said portion where the reduced extension numbered 51' stops at its upper end. In other words, the stem 55, which is pendantly hung from the bail member 54, may float up and down as much as is allowed by the space 63 shown in Figure 2. When the valve-stem 51 is raised all the way to the "open" position, then the valve-stem 55 is locked against floating movement with the valve 56 positively held off the seat 57.

Located in the hollow valve plug 32 is the usual floating check valve 32ᵃ. The valve 32 is provided with a port 32ᵇ and a wide cut-out port 32ᶜ, while the valve socket 31ᵃ is formed with a port 31ᵇ. There is also a port in the socket 31ᵃ for the passage 41; a port for the vacuum milker hose 40; and a port and passage 31ᶜ for letting atmosphere into the pail 30 from port 31ᵇ. This completes the details of construction, and the mode of operation and use of the system will now be described.

Figure 7:
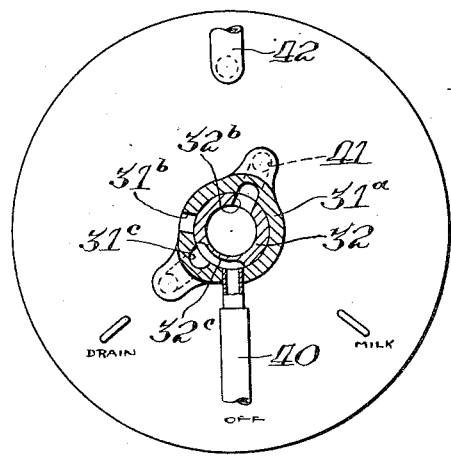
Figure 7 is a similar view, showing the valve in milking position.
Figure 8:
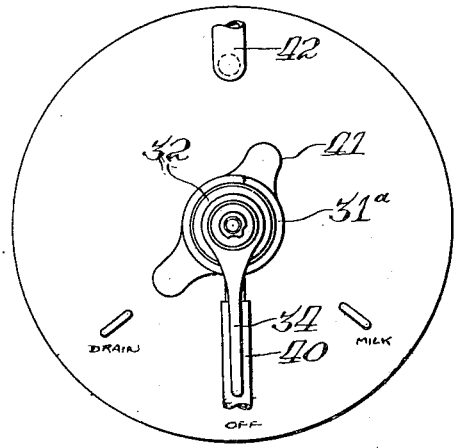
Figure 8 is a plan view of the same parts, showing the valve in the position corresponding to Figure 6.

The first step, of course, is to draw milk from the cow 12 by means of the teat cups 39, and this is accomplished by first seeing to it that the valve 56 is set in its "check" position, whereby the weight of the valve 56 causes it to seat against the seat 57 and make it possible to hold vacuum in the pail 30 automatically. The valve 43, of course, is closed, so that compressed air cannot enter the pail 30, and the valve handle 34 on the milk control valve 32 is set to position valve 32 as shown in Figure 7, so that vacuum can pass through the hose 40 to draw milk from the teat cups in the usual manner. In this position, port 32ᵇ communicates with passage 41 and the cut-out 32ᶜ, and the hose 40 also communicates with the pail through port 31ᶜ. Atmospheric port 31ᵇ is closed. This means, of course, that the valve 45 will be opened to allow vacuum to pass to the pulsator and into the pail 30 through the valve 32, which has the handle 34 set in one of the three positions to make the correct connections, as described. Vacuum, of course, draws the milk into the pail 30.

Figure 6:
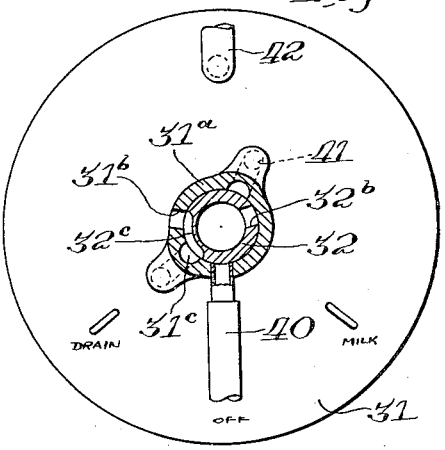
Figure 6 is a similar view, showing the valve in its shut off position.

As the milking proceeds, the milk is drawn into the pail 30 from hose 40 and passage 41, where it is automatically weighed, since said pail is suspended from a balance 28. By means of the valve 37, a sample may be drawn from the pail 30 to test same after vacuum has been released or while air pressure is on the pail, it being understood that this valve 37 normally is closed during milking. When the pail 30 is full, or when all of the milk available has been taken from the cow, the handle 34 will be moved to cut off the vacuum and to establish certain connections. In cutting off the vacuum when milking has ceased, the handle 34 is moved from the "milk" position of Figure 7 through the "off" position of Figure 6, where the pail is momentarily opened to atmosphere through port 31ᵇ, cut-out 32ᶜ and passage 31ᶜ to break the vacuum within the pail before applying the compressed air. Continuing to move the handle 34, the valve 32 is turned to the position of Figure 5, which is the drain position. In this position, all ports are closed. Now, when the handle 43 is opened, compressed air from the pipe 20 will enter the pail 30, said pressure serving to force the milk upwardly through the hose 46 with the pressure automatically unseating the valve 57, so that the milk may enter the pipe-line 25 for delivery to a milk supply tank 64 carried by a bracket 65 and thence into a milk cooler 66, if desired, before transfer to a final bulk receiver 67.

In cleaning the sanitary milk pipe-line, a sterilizing solution container 68 may be provided and, by setting the valve stem 51 in a wide-open position, a hose 69 may be dropped into said tank 68 and coupled to the pipe-line 25, whereupon, by turning on vacuum in the pail 30, a solution can be drawn from the tank 68 into the pipe-line 25 to cleanse the pipe-line 25, it also being possible in this fashion to draw the solution into the pail 30 for cleaning the latter.

It can now be seen that an improved pressure releaser milker system has been provided which achieves the objects of the invention.

It is the intention to cover all changes and modifications of the example of the invention herein shown which do not depart from the spirit and scope of the invention, which has been defined in the appended claims.

What is claimed is:

1. In a releaser milker system, a milk receiver pail to receive milk from a milking machine, a vacuum pipe to supply vacuum to the pail and machine, a milk pipe in the system including a connection with the pail, the combination with said pail of a source of compressed air, means to cut off the vacuum supply to the pail, and means to supply compressed air from said compressed air supply to the pail whereby the milk in the pail will be forced therefrom into the milk pipe-line through its connection with the pail.

2. In a releaser milker system, the combination embodying a vacuum supply pipe, a compressed air supply pipe and a separate milk outlet pipe, a pail connectible with the vacuum pipe to receive milk from the teat cups of a milking machine, valve means to cut off vacuum from the pail and to supply compressed air thereto from said air pipe, and a conduit to conduct the milk from the pail into said milk pipe.

3. In a releaser milker system, a milk receiver pail to receive milk from the teat cups of a milking machine, a pulsator including a valve on the pail, a vacuum pipe connected to said valve to supply vacuum to the pail and machine, a milk pipe in the system including a connection with the pail, the combination with said pail of a source of compressed air, means to cut off the vacuum supply to the pail, and means to supply compressed air to the pail whereby the milk in the pail will be forced therefrom into the milk pipe-line through its connection with the pail.

4. In a releaser milker system, a pendant milk receiver pail to receive milk from the teat cups of a milking machine, a vacuum pipe to supply vacuum to the pail and teat cups, a milk pipe in the system including a connection with the bottom of the pail, the combination with said pail of a source of compressed air, means to cut off the vacuum supply to the pail, and means to supply compressed air from said source to the pail through the top of the latter whereby the milk in the pail will be forced therefrom into the milk pipe-line through its connection with the pail.

5. In a releaser milker system, a milk receiver pail to receive milk from a milking machine, a vacuum pipe to supply vacuum to the pail and machine, a milk pipe in the system, a conduit connecting the milk pipe and pail, the combination with said pail of a source of compressed air, means to cut off the vacuum supply to the pail, and means to supply compressed air from said source to the pail whereby the milk in the pail will be forced therefrom into the milk pipe-line through the said conduit, and a valve in said milk pipe to control the connection of the conduit therewith.

6. In a releaser milker system, a milk receiver pail to receive milk from a milking machine, a vacuum pipe to supply vacuum to the pail and machine, a milk pipe in the system, a conduit connecting the milk pipe and pail, the combination with said pail of a source of compressed air, means to cut off the vacuum supply to the pail, and means to supply compressed air from said source to the pail whereby the milk in the pail will be exhausted therefrom into the milk pipe-line through said conduit, and an automatically acting valve governing communication between the conduit and milk pipe, said valve being closed when the pail is under vacuum and automatically opening when compressed air is supplied to the pail.

7. In a releaser milker system, a milk receiver pail to receive milk from a milking machine, said pail having a cover including a valve, a vacuum pipe to supply vacuum to the pail and machine, a milk pipe in the system including a connection with the bottom of said pail, the combination with said pail of a source of compressed air, means to cut off the vacuum supply to the pail, means to supply compressed air from said source to the pail whereby the milk in the pail will be exhausted therefrom into the milk pipe-line through its connection with the pail, and another valve in said latter connection.

8. In a releaser milker system, the combination embodying a vacuum supply pipe, a compressed air supply pipe and a milk exhausting pipe, a pail connectible with the vacuum pipe to receive milk from a milking machine, valve means to cut off vacuum from the pail and to supply compressed air thereto from said air pipe, a conduit to exhaust the milk from the pail into said milk pipe, and means to condition the air before it enters the compressed air pipe.

FLOYD G. HODSDON.